United States Patent Office 3,663,421
Patented May 16, 1972

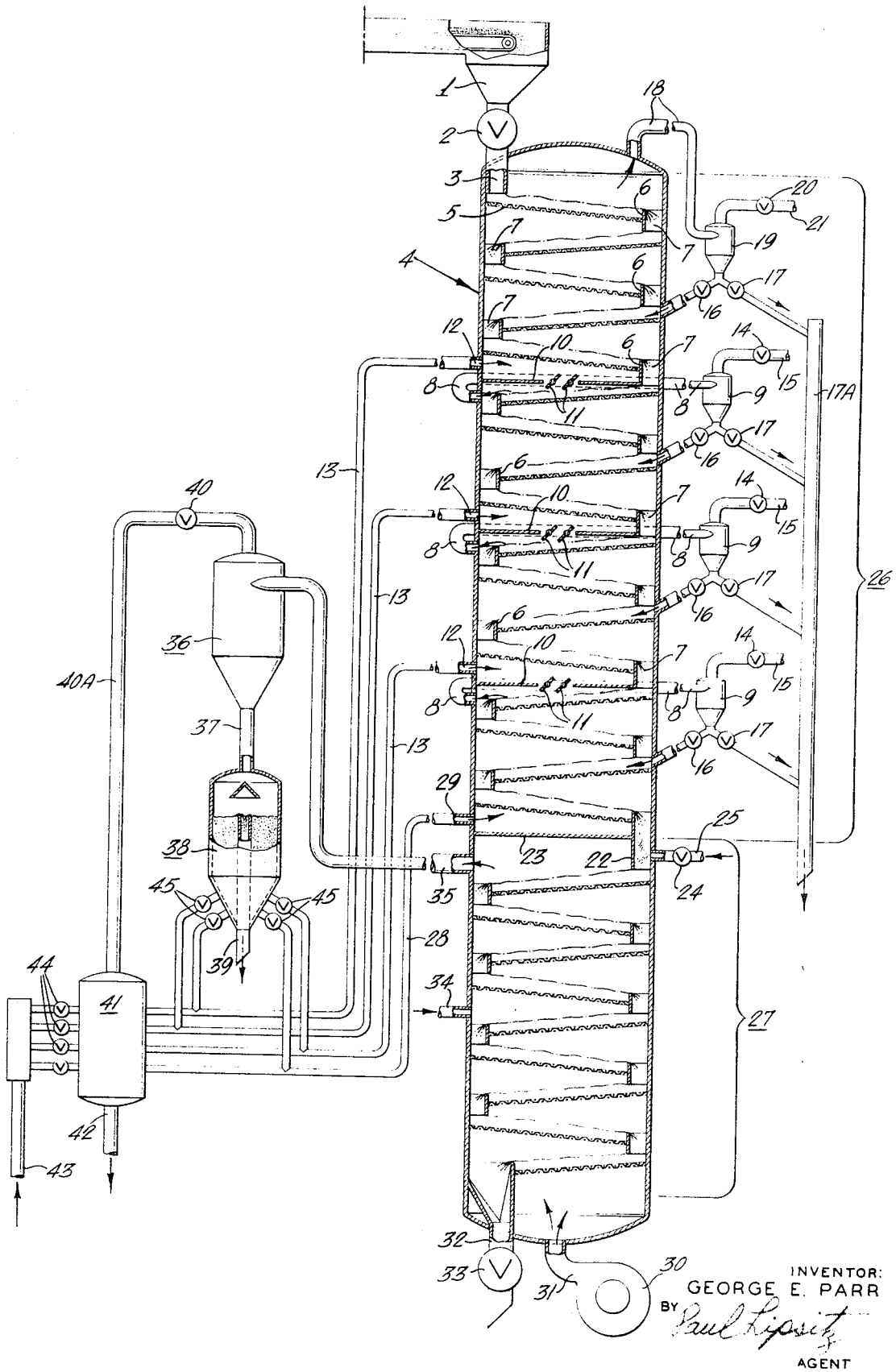

3,663,421
CONTINUOUS, FLUIDIZED PROCESS AND SYSTEM FOR THERMAL RECOVERY OF HYDROCARBONACEOUS MATERIALS FROM SOLIDS
George E. Parr, West Chester, Pa., assignor to Sun Oil Company, Philadelphia, Pa.
Filed Nov. 4, 1970, Ser. No. 86,710
Int. Cl. C10b 53/06
U.S. Cl. 208—8
5 Claims

ABSTRACT OF THE DISCLOSURE

The invention relates to a new process and apparatus for the thermal recovery of valuable liquid and gaseous hydrocarbon products from hydrocarbonaceous materials. The process is conducted within a vessel which has contiguous thermal treatment zones and spent solids combustion zones separated by a gas seal; the thermal treatment zone is characterized by maintaining a fluidized bed of the hydrocarbonaceous material on shallow-bed concatenated, slanting trays; a plurality of sidestream outlets to remove condensable hydrocarbon products and a plurality of hot gas inlets which serves to maintain fluidization and give temperature control.

In prior art proceses for recovering hydrocarbon products from oil shale and similar materials much difficulty is experienced in the retorting step where the desired products are driven from oil bearing shale. The process and apparatus of this invention significantly alleviate these difficulties and provide a highly efficient process for thermal recovery of valuable hydrocarbons.

The process of the present invention comprises the steps of feeding hydrocarbonaceous solids of an economically obtained particle size into a thermal treatment zone were said solids are maintained as a fluidized bed on shallow-bed concatenated, slanting trays. The solids are contacted with the hot fluidizing gas whereby volatile constituents from the solids are formed and these gaseous condensable hydrocarbon products are withdrawn from the thermal treating zone by a plurality of sidestream outlets where any solids present are separated and the product vapors condensed into liquid hydrocarbons. The spent solids from the thermal treatment zone are passed through a seal of injected gas at the bottom of the thermal treatment zone into a spent solids combustion zone which is contiguous to the thermal treatment zone. The gas seal prevents passage of gas from the thermal treatment zone to the solids combustion zone or from the solids combustion zone into the thermal treatment zone, but at the same time the seal allows passage of the spent solids into the combustion zone. The process then further comprises in another embodiment, burning the spent solids to produce hot combustion gas which is passed in non-contaminating heat exchange contact with the cooled fluidizing gas taken from the thermal treatment zone, and recycling the reheated gas into the thermal treatment zone as the hot fluidizing gas.

As pointed out above, the particle size of the hydrocarbonaceous solids used in the process is readily and economically obtained. The hydrocarbonaceous solids need only be reduced in size to 0.25 inch minus. Because of the poor heat conductivity of the material, particles which are much above about 0.25 inch in size will result in a less efficient process where yields of hydrocarbon product are low. On the other hand, any particle size below about one-quarter inch is operable, but there is no need to expend energy and money to obtain much smaller particles.

An important requirement for the process to operate efficiently is that the concatenated, slanting trays be shallow and that the fluidized solids on these trays be no greater in depth than about twelve inches, preferably about 2 to 8 inches. As the solids enter at the top of the thermal treatment retort zone they are maintained as fluidized solids by hot gases introduced into the retort at various levels as shown in the drawing which will be described later. These fluidized solids, by virtue of the fact that they will act as a liquid and because of the slanting concatenated trays, will flow from top to bottom of the retort zone. As they flow downwardly, the volatile products generated by the elevated temperature within the retort, and which will be between about 50° C. and about 500° C., will be removed by an overhead and sidestream outlets, equipped with separators for any solids present, and the volatile hydrocarbons will be condensed and subjected to further processing as is well known in the art.

The present invention in various of its embodiments resolves numerous problems encountered in the recovery of liquid and gaseous hydrocarbon products from oil-bearing solids by countercurrent contact with hot gas in a fluidized or other type retorting zone used to vaporize oil from the solids. In some operations, improper fluidization causes channeling, excessive pressure drops and varying exposure of the solids to the thermal gases resulting in incomplete thermal treatment of some solids. Often in non-fluidized types of thermal treatment systems, clinkering of decrepitates from the shale results because of excessive temperatures in the system.

Another problem encountered in thermal recovery operations has been erratic temperature control. Oil shales and other hydrocarbonaceous solids have discrete sintering ranges. Therefore, unless the retorting temperature of the solids is controlled and excess heat is avoided, the gaseous products driven from the solids will be carbonized and the hydrocarbon liquids will begin to crack. This secondary cracking is undesirable because it results in larger amounts of gas formation and less of the desired liquid products. In addition, the sintering of solids occurs at about 850° C. and this, too, is undesirable.

The present invention with its several embodiments eliminates or substantially reduces these problems encountered in retort processes by means of: (a) plural shallow-bed concatenated, slanting trays for conducting a fluidized distillation; (b) a plurality of sidestream outlets for removing the hydrocarbonaceous products of the retorting operation in successive boiling fractions, and (c) a plurality of hot gas inlets for adjustment for temperature and fluidization conditions for optimum processing within consecutive zones of the retort.

The drawing is a representation of an apparatus used for the thermal recovery of carbonaceous materials from solids which apparatus utilizes each of the several embodiments of the present invention.

The apparatus of the above-described improved process comprises (a) a retort vessel for the thermal treatment of hydrocarbonaceous solids to distill volatile constituents from the solids to produce spent solids and gaseous products; (b) a spent solids combustion vessel in contiguous relationship to the retort vessel for the burning of the spent solids to thereby produce hot gas; and (c) a gas injection inlet between the combustion vessel and the retort vessel which inlet serves to feed a gas to form a gas seal between the vessels to allow the passage of spent solids from one zone to the other while prohibiting the passage of gases between the zones.

In the drawing the raw carbonaceous solids such as oil shale, coal, etc., are charged, as shown in the figure, from hopper 1 through flow control 2 and line 3 into the top tray 5 of vessel 4. The flow control 2 can comprise any control means such as, for example, a star valve.

Vessel 4 which contains the thermal treatment zone 26 of the present invention contains a plurality of trays slightly inclined to promote crossflow of the solids. The tray system is provided with dams 6 and downcomers 7 which control the bed height of fluidized solids and the tray-to-tray sealing. The trays can be perforated, slotted or can be provided with gas inlet heads.

The crushed solids, fluidized by upflowing hot gases as described infra, flow across each tray and downwardly through vessel 4 from tray to tray. As the solids pass downwardly, heat transfer between the solids and upflowing hot gases, containing controlled amounts of hot solids fines, takes place in a combination of countercurrent and crossflow heat exchange. Since, in fluidized systems, temperature equalization occurs essentially within a few inches of depth, bed depths of one or two inches to about a foot are adequate for efficient heat exchange. This combination of crossflow of solids and low bed depths affords pressure drop advantages, particularly under high throughput conditions.

As the solids move downwardly in vessel 4, they are progressively heated to temperatures at which pyrolytic action causes the hydrocarbonaceous materials to evolve as gases and vapors. Small fines resulting from decrepitation of the crushed solids are elutriated by the upflowing gases. This eliminates any adverse effects their accumulation might produce in the fluidized system.

At preselected locations in vessel 4, determined by the processing requirements, "sidestream" outlets 8 connected to vessel 4 and to appropriate solids removal equipment 9 (e.g., single or multistage cyclones, mechanical separators, precipitators and/or others well known in the art) permit the removal of hydrocarbonaceous "cuts" and undesirable small fines. Three such sidestream outlets are illustrated in the drawing, however, more or fewer outlets can be used according to the needs of the process and/or the type of operation desired. Also, more than one outlet connection from vessel 4 to solids separator 9 can be made at alternate locations through appropriate manifolding and valving. Such details are obvious to those practiced in the art. The "sidestream cuts" afforded by this system can be pretreated individually before refining by more efficient and economical procedures than can a single product from other thermal recovery systems. Furthermore, the concomitant removal of small fines through the sidestream outlets prevents their adverse accumulation in the upper solids beds in vessel 4. Located above each sidestream outlet 8 is a diaphragm partition 10 which, except for controllable opening 11 in the diaphragm, effectively seals off vessel 4 at that location from upflowing gases. Above each diaphragm partition 10 and above diaphragm partition 23, hot inlets 12 and 29 respectively, connected respectively to external lines 13 and line 28 provide entry for hot gases, at controlled velocities and containing controlled amounts of hot solids, to vessel 4 to heat and/or react with the downflowing solids on the upper trays. The amount of sidestream material removed through outlets 8 can be varied and controlled by suitable adjustment of control valves 14 in outlet line 15. In turn, proper adjustment of variable openings 11 (e.g., damper, butterfly, covered slots, variable orifices or others well known in the art) in diaphragm partitions 10 maintain the desired pressure gradient in vessel 4. Thus, vessel 4 is divided into zones in each of which the velocity, temperature and hot solids content of the fluidizing gases can be set and controlled to independently provide various sidestream cuts. This feature allows an adjustment of operating conditions within each zone for optimum processing. The solids removed in separators 9 are either returned to vessel 4 through control valves 16 into a higher temperature zone for further removal of any remaining hydrocarbonaceous material or a portion of the solids or all the solids can be passed through control valves 17 into fines manifold 17-A and thence to a waste heat exchanger before ultimate disposal. Overhead gases and solid fines plus any light vapors evolved in preheating the crushed solids leave vessel 4 through line 18 into solids separator 19 which can be arranged similarly to the sidestream system described above. The essentially solids-free gases and vapors leave separator 19 through control valve 20 and line 21 to the downstream processing units (not shown).

Operating conditions in vessel 4 are maintained so that all recoverable hydrocarbonaceous material is removed before the downflowing solids reach seal leg 22. The solids after passing through seal leg 22 enter the fluidized combustion and cooling zone 27 of vessel 4. This zone 27 is mechanically sealed from the upper sections by diaphragm partition 23 and vapor sealed by seal gas (e.g., flue gas) entering seal leg 22 through control valve 24 and line 25.

The solids in the lower section of the thermal treatment zone 26 above diaphragm partition 23 are fluidized on trays as shown and heated by hot gases and solid fines entering vessel 4 through line 28 which is connected to inlet 29.

Ambient air mixed, if necessary, with enough cool flue gas to fluidize the downwardly flowing solids enters the combustion portion of vessel 4 through compressor 30 and line 31. The air cools the solids by a combination of countercurrent and crossflow heat exchange. The cooled solids, in aggregate form, leave vessel 4 through line 32 and flow control 33 to spent aggregate disposal. The upflowing air, with or without flue gas as required, is heated by the downwardly flowing hot solids to temperatures at which combustion of any remaining carbonaceous material in the solids is effected. The rate of combustion is controlled by introducing regulated amounts of partially cooled flue gas into vessel 4 through line 34. Hot gases comprising air, introduced flue gas, and products of combustion plus entrained solids fines leave vessel 4 through line 35 and enter solids separator 36. This separator 36 can comprise suitable cyclones, mechanical separators, precipitators or any other separating equipment well known in the art. The separated hot solid fines flow through line 37 into hopper 38. Hopper 38 is equipped with a requisite number of outlets with valves 45 to supply hot solids to fluidizing gas in lines 13 and 28. Any excess hot solid fines leave hopper 38 through overflow line 39 and proceed to a waste heat exchanger before final spent fines disposal. Hot gases leave separator 36 through control valve 40 and line 40-A and pass through gas-to-gas heat exchanger 41 and then through line 42 to a waste heat exchanger and exhaust stack.

Fludizing gas, part of which may be non-condensables from the product gases leaving vessel 4, enter the system through line 43, control valves 44, and heat exchanger 41. These fluidizing gas streams, partly or completely heated in exchanger 41, pick up and carry into vessel 4 controlled quantities, if any, of hot solid fines, as desired or required, which fines are introduced into lines 13 and 28 through control valves 45 as mentioned above.

The process and apparatus described above provides an extremely efficient means to release valuable hydrocarbon products from hydrocarbonaceous materials and enables at least about 90 percent yield (by Fisher assay) of organic products in the hydrocarbonaceous material to be recovered.

The invention claimed is:

1. A process for the recovery of hydrocarbons from hydrocarbonaceous solids which comprises the steps of feeding said hydrocarbonaceous solids having a particle size of about one-quarter inch minus to a thermal treatment zone, maintaining said solids fluidized on concatenated, slanting trays having a bed depth of less than about 12 inches and withdrawing fine solids and condensable hydrocarbon gaseous products from an overhead outlet and a plurality of sidestream outlets.

2. A process as in claim 1 where the spent hydrocarbonaceous solids are passed through a gas seal into a combustion zone where said solids are burned to provide heat for exchange to the fluidizing gases fed into said thermal treatment zone.

3. A process as in claim 1 where the solid fines are returned to said thermal treatment zone at a point higher in temperature than the point at which said fines were removed.

4. An apparatus for thermal recovery of hydrocarbons from hydrocarbonaceous solids comprising a vessel having an upper retort section and a lower combustion section contiguous therewith and separated by gas sealing means, means to introduce said solids into said upper section, multiple means for introducing hot gases to both upper and lower sections of said vessel to fluidize said solids on concatenated, slanting trays in said upper and lower sections, said trays being provided with dams and downcomers to control bed depth to less than about 12 inches, an overhead outlet and a plurality of sidestream outlets connected to said upper retort section to withdraw condensable gaseous products, exit means at the top of said combustion zone for said fluidizing gas, and exit means at the bottom of said combustion zone for disposal of spent solids.

5. An apparatus as in claim 4 where said sidestream outlets are filled with cyclone separators and valving means to separate fine solids and, optionally, return all or a portion of said fines to said retort section at a point having a temperature higher than at the point said fines were taken from said retort section.

References Cited

UNITED STATES PATENTS

| | | | |
|---|---|---|---|
| 2,626,234 | 1/1953 | Barr et al. | 202—121 |
| 2,734,851 | 2/1956 | Smith | 201—31 |
| 2,776,935 | 1/1957 | Jahnig et al. | 201—31 |
| 3,106,521 | 10/1963 | Huntington | 208—11 |
| 3,475,319 | 10/1969 | MacLaren | 208—11 |

CURTIS R. DAVIS, Primary Examiner

U.S. Cl. X.R.

201—23, 34, 36; 202—120, 121, 209, 221; 208—11